United States Patent
Liu et al.

(10) Patent No.: US 11,380,299 B2
(45) Date of Patent: Jul. 5, 2022

(54) CAPTURING DEVICE OF REMOTE WARNING SOUND COMPONENT AND METHOD THEREOF

(71) Applicant: AWNT LIMITED, New Taipei (TW)

(72) Inventors: Yi-Chang Liu, New Taipei (TW); Li-Min Sun, Beijing (CN)

(73) Assignee: AWNT LIMITED, New Taipei (TW)

(*) Notice: Subject to any disclaimer, the term of this patent is extended or adjusted under 35 U.S.C. 154(b) by 0 days.

(21) Appl. No.: 17/368,939

(22) Filed: Jul. 7, 2021

(65) Prior Publication Data

US 2022/0013101 A1    Jan. 13, 2022

(30) Foreign Application Priority Data

Jul. 7, 2020 (TW) .................................. 109122921

(51) Int. Cl.
*G10K 11/178* (2006.01)
*B60W 50/14* (2020.01)

(52) U.S. Cl.
CPC ....... *G10K 11/17883* (2018.01); *B60W 50/14* (2013.01); *G10K 11/17823* (2018.01); *B60W 2050/143* (2013.01); *G10K 2210/1282* (2013.01)

(58) Field of Classification Search
None
See application file for complete search history.

(56) References Cited

U.S. PATENT DOCUMENTS

2019/0035381 A1*   1/2019   Maziewski .......... H04R 29/001

* cited by examiner

*Primary Examiner* — Kenny H Truong

(57) ABSTRACT

The present disclosure relates a capturing device of remote warning sound component which utilizes an audio pick-up device receives a remote sound signal in a remote range, and a processor generates a warning sound component through amplifying a sound feature point audio in a sound component according to warning voiceprint data and generates non-warning sound components through suppressing or shielding the sound feature point audio in the other sound components according to non-warning voiceprint information. Then the processor combines the warning sound component and the non-warning sound components to generate an output sound signal, allowing a speaker to output the output sound signal. Accordingly, the capturing device of the present disclosure provides instantly warning sound which is received (e.g. sound of car engine) from a remote range and outputs to allow the user in an early alert state, then reducing the probability of incident occurs thereby.

14 Claims, 3 Drawing Sheets

CAPTURING DEVICE OF REMOTE WARNING SOUND COMPONENT AND METHOD THEREOF

CROSS-REFERENCE TO RELATED APPLICATION

The present disclosure is based upon and claims priority to Taiwan Patent Application No. 109122921, filed on Jul. 7, 2020, the content of which is incorporated herein by reference in its entirety for all purposes.

BACKGROUND

1. Technical Field

The present disclosure relates to a field of remote sound component capturing, and more particularly to a capturing device of remote warning sound component and method thereof to capture a related warning sound component in a remote range.

2. Description of the Related Art

In a noisy environment, it is difficult to hear a sound of a specific object in this environment since the environmental sound in the surroundings or other sounds would easily drown out the sound of the specific object (such as a car) coming from a remote end. Thus, when the car is approaching a location near the user, accidents may occur because the user cannot be aware of the car in time. For example, the user driving on a straight lane cannot notice immediately when the car is pulling out from an alley.

In this case, a sound collector of the prior art may be installed on an audio pick-up device, and by the physical constriction of the sound collector, the audio pick-up device can be focused to receiving the sound emitted from specific direction.

However, the warning sound components emitted from the remote end (such as car engine sound, motorcycle engine sound, and horn sounds of ambulance, police car and fire truck, etc.) are usually emitted from all directions instead of in a specific direction. Therefore, it cannot effectively warn the user if the prior art only receives sound in a specific direction. Furthermore, the audio pick-up device cannot automatically recognize the source making the warning sound component, and barely provide the user to select a specific object when the audio pick-up device receives a plurality of sounds, and then amplify the sound component of the specific object selected with various processing methods.

Since the response speed of the user is extremely important when the danger occurs, the processing method of the prior art may not be able to provide the user with the related warning sound component in time before the related accident occurs.

Therefore, how to provide a device that can determine a warning sound component in a remote range from all directions is required to improve the problems existing in the prior art.

SUMMARY

The purpose of the present disclosure is to provide a capturing device of remote warning sound component, which primarily receives a remote sound signal which is detected in a remote range, then generates and outputs a warning sound component to be heard by a user when at least one sound component extracted from the remote sound signal conforms to warning voiceprint data and a sound feature point audio in the sound component is amplified. Accordingly, instantly outputting warning sound which is received from the remote range is provided to allow the user in an early alert state, then reducing the probability of incident occurs, further effectively improving the problems of the prior art thereby.

Based on the purpose of the present disclosure, which provides a capturing device of remote warning sound component, comprises: a case; an audio pick-up device disposed in the case, receiving a remote sound detected in a remote range and generating a remote sound signal; a processor disposed in the case and connected to the audio pick-up device, the processor receiving the remote sound signal and extracting at least one sound component from the remote sound signal, comparing sound feature points in the at least one sound component with a plurality of warning voiceprint data and a plurality of non-warning voiceprint data, identifying sound feature point audios conforming to the warning voiceprint data and the non-warning voiceprint data from the sound component by using a deep learning algorithm, and amplifying at least one of the sound feature point audios conforming to the warning voiceprint data to generate a warning sound component, and suppressing or shielding the sound feature point audios conforming to the non-warning voiceprint data to generate non-warning sound components, wherein the processor performs a combining process to combine the warning sound component with the non-warning sound components and generate an output sound signal; a speaker disposed in the case and connected to the processor to receive and output the output sound signal; and a register connected to the processor for storing the plurality of warning voiceprint data, the plurality of non-warning voiceprint data, the remote sound signal, the sound feature points, the sound feature point audios, the output sound signal, or any combinations of two or more thereof.

In an embodiment, the processor amplifies at least one of the sound feature point audios conforming to the warning voiceprint data based on an amplification threshold.

In an embodiment, the capturing device includes: a detector connected to the audio pick-up device, wherein the detector provides a beam formed by at least two of acoustic waves in the remote range, detects a vibration waveform according to the beam to generate the remote sound signal, and transmits the remote sound signal to the audio pick-up device from the detector.

In an embodiment, the remote range is in a range of 1 meter to 10 meters.

In an embodiment, a frequency range of the remote sound signal is in a range of 1 Hz to 20000 Hz.

In an embodiment, the capturing device includes: an activator connected to the processor and the audio pick-up device, wherein the activator receives the remote sound signal from the audio pick-up device to determine whether to activate the processor according to an activation threshold by comparing with a sound component data of the remote sound signal, the activator activates the processor to extract the at least one sound component from the remote sound signal when the sound component data conforms to the activation threshold, the activator continually receives another remote sound signal when the sound component data does not conform to the activation threshold.

In an embodiment, the sound component data includes a decibel value, a frequency value, or a combination of two thereof.

Another purpose of the present disclosure is to provide a capturing method of remote warning sound component, which primarily receives a remote sound signal which is detected in a remote range, then generates and outputs a warning sound component to be heard by a user when at least one sound component extracted from the remote sound signal conforms to warning voiceprint data and a sound feature point audio in the sound component is amplified. Accordingly, instantly outputting warning sound which is received from the remote range is provided to allow the user in an early alert state, then reducing the probability of incident occurs, further effectively improving the problems of the prior art thereby.

Based on another purpose of the present disclosure, which provides a capturing method of remote warning sound component, applicable to a capturing device of remote warning sound component, the capturing method comprises: receiving a remote sound detected in a remote range and generating a remote sound signal by an audio pick-up device; extracting at least one sound component by a processor from the remote sound signal; comparing sound feature points in the at least one sound component with a plurality of warning voiceprint data and a plurality of non-warning voiceprint data by the processor; identifying sound feature point audios conforming to the warning voiceprint data and the non-warning voiceprint data from the sound component by using a deep learning algorithm by the processor; amplifying at least one of the sound feature point audios conforming to the warning voiceprint data by the processor to generate a warning sound component; suppressing or shielding the sound feature point audios conforming to the non-warning voiceprint data by the processor to generate non-warning sound components; performing a combining process by the processor to combine the warning sound component and the non-warning sound components and generate an output sound signal; receiving and outputting the output sound signal by the speaker; and storing the plurality of warning voiceprint data, the plurality of non-warning voiceprint data, the remote sound signal, the sound feature points, the sound feature point audios, the output sound signal, or any combinations of two or more thereof by a register.

In an embodiment, the processor amplifies at least one of the sound feature point audios of the sound component conforming to the warning voiceprint data based on an amplification threshold.

In an embodiment, the capturing method includes: providing a beam formed by at least two of acoustic waves in the remote range by a detector to detect a vibration waveform according to the beam and generate the remote sound signal; transmitting the remote sound signal to the audio pick-up device from the detector.

In an embodiment, the remote range is in a range of 1 meter to 10 meters.

In an embodiment, a frequency range of the remote sound signal is in a range of 1 HZ to 20000 HZ.

In an embodiment, the capturing method includes: receiving the remote sound signal from the audio pick-up device by an activator to determine whether to activate the processor according to an activation threshold by comparing with a sound component data of the remote sound signal; activating the processor by the activator to extract the at least one sound component from the remote sound signal when the sound component data conforming to the activation threshold; or receiving another remote sound signal continually by the activator when the sound component data being not conforming to the activation threshold.

In an embodiment, the sound component data includes a decibel value, a frequency value, or a combination of two thereof.

In order to lead the purposes, features, and advantages of the present disclosure as described above can be obviously understandable, the specific embodiments listed in the drawings are described in detail below.

DESCRIPTION OF THE PREFERRED EMBODIMENTS

The advantages, features, and technical methods of the present disclosure are to be explained in detail with reference to the exemplary embodiments and the drawings for a better understanding of the present disclosure. Moreover, the present disclosure may be realized in different forms, and should not be construed as being limited to the embodiments set forth herein. Conversely, for a person of ordinary skill in the art, the embodiments provided shall make the present disclosure convey the scope more thoroughly, comprehensively, and completely. In addition, the present disclosure shall be defined only by the appended claims.

The terms used in the present disclosure are only for the purpose of describing specific embodiments, not intended to limit the present disclosure. Unless otherwise defined, the technical terms or scientific terms used in the present disclosure shall have the usual meanings understood by those with ordinary skills in the field to which this disclosure belongs. The "one" or "a" or other similar words used in the specification of the present disclosure and the claims do not mean a limit of quantity, but mean that there is at least one. Unless otherwise stated, "including" or "comprising" or other similar words mean that the elements or objects before "including" or "comprising" contains the elements or objects or their equivalents listed after "including" or "comprising", and other elements or objects are not excluded. Similar words such as "connection" or "connect" are not limited to physical or mechanical connections, and may include electrical connections, no matter whether direct or indirect. The singular forms of "a", "the" and "this" used in the specification and claims of this disclosure are also intended to include plural forms, unless the context clearly indicates other meanings. It should also be understood that the term "and/or" as used herein refers to any or all possible combinations of one or more associated listed items.

Figure 1:
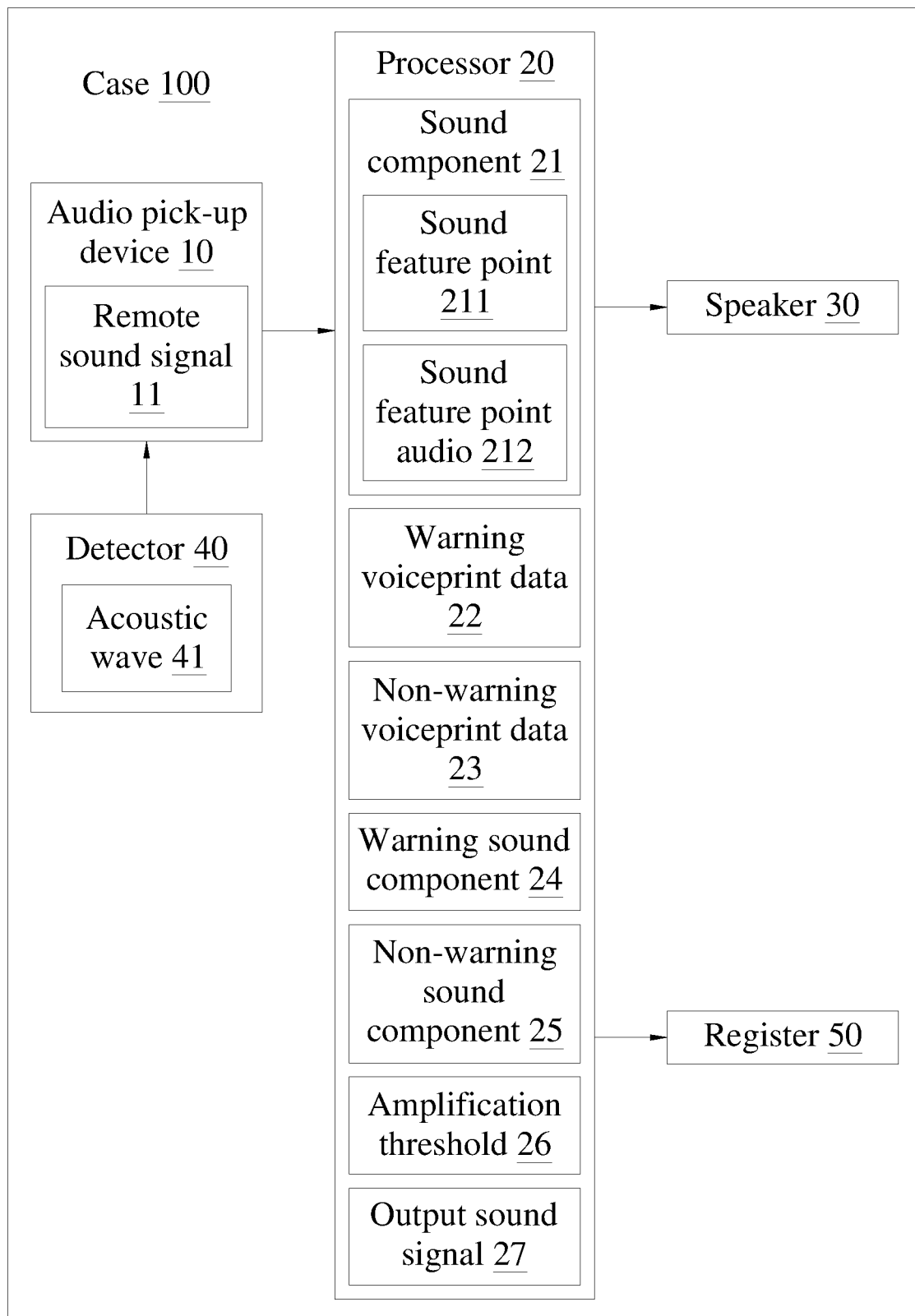
FIG. 1 illustrates a schematic diagram of elements configuration of the present disclosure.

Please refer to FIG. 1 which is a schematic diagram of elements configuration of the present disclosure. As shown in the figure, the present disclosure primarily consists of an audio pick-up device 10, a processor 20, and a speaker 30 in a case 100. The audio pick-up device 10 may specifically be a microphone or other related devices that can receive an external sound. In order to effectively receive an analyzed and processed sound in a remote range and generate a remote sound signal by the present disclosure, the audio pick-up device 10 disclosed herein is limited to receiving a remote sound detected in the remote range (e.g. between 1 meter to 10 meters) and generating a remote sound signal 11 (e.g. a sound frequency of the remote sound signal 11 is between 1 HZ to 20000 HZ). Specifically, a capturing device of remote warning sound component of the present disclosure further includes a detector 40 which is mainly configured to provide an acoustic wave 41 in the remote range, to determine that an external sound wave has been detected when the acoustic wave 41 being vibrated affected by a vibration waveform of the external sound wave. In detail, the acoustic wave 41 can be separated into two acoustic waves 41 (e.g. a first acoustic wave and a second acoustic wave), and forming a beam on an overlapped area of the first acoustic wave and the second acoustic wave, consequently, the beam formed by the detector 40 is allowed to detect the vibration waveform, and is provided to the detector 40 to generate the remote sound signal 11 according to the vibration waveform. Thus, the audio pick-up device 10 can receive the remote sound signal 11 from the detector 40 when the detector 40 is connected to the audio pick-up device 10. Wherein, the detector 40 may be a module provided in the case 100, or the detector 40 can be provided on the audio pick-up device 10. As long as the detecting of the acoustic wave 41 in the remote range is provided by the detector 40, it shall belong to the scope of the patent to be protected by the present disclosure.

The processor 20 may specifically be a central processing unit or other devices capable of data processing. The processor 20 can receive the remote sound signal 11 from the audio pick-up device 10 when the processor 20 is connected to the audio pick-up device 10. Currently, at least one sound component 21 from the remote sound signal 11 will be extracted by the processor 20 (such as the sound of a specific object and other environmental sounds). To effectively distinguish the differences between the sound components 21, the processor 20 compares sound feature points 211 in the at least one sound component 21 with a plurality of warning voiceprint data 22 and a plurality of non-warning voiceprint data 23 after each of the sound components 21 is extracted, the plurality of warning voiceprint data 22 and the plurality of non-warning voiceprint data 23 can be obtained through a period of sound learning or the data stored in an original register 50, wherein the plurality of warning voiceprint data 22 primarily refers to the sounds emitted by related objects that may cause accidents or harm to the human body, such as car engine sounds, motorcycle engine sounds, the horns of ambulances, police car and fire truck horns, etc. On the contrary, the plurality of non-warning voiceprint data 23 refers to the sounds produced by related objects that will not cause accidents or harm to the human body, such as wind, door sounds or other environmental sounds.

After the sound feature points 211 of the at least one sound component 21 are compared, the processor 20 further identifies the sound feature points 211 by a deep learning algorithm to distinguish the sound feature point audios 212 that conforms to the warning voiceprint data 22 and the sound feature point audios 212 that conforms to the non-warning voiceprint data 23 from the sound component 21, and amplifies at least one of the sound feature point audios 212 that conforms to the warning voiceprint data 22 after identifying the sound feature point audios 212 from the sound components 21, to generate a warning sound component 24, then suppresses or shields the sound feature point audios 212 that conforms to at least one of the non-warning voiceprint data 23 from the sound components 21, to generate non-warning sound components 25, for highlighting the sound of the warning sound component 24.

When the processor 20 is performing an amplification process, it might be frightened the user and cause related accidents if the sound feature point audio 212 of the warning sound component 24 is over-amplified. In order to avoid such situations, the processor 20 amplifies at least one of the sound feature point audios 212 that conforms to the warning voiceprint data 22 according to an amplification threshold 26 when performing the amplification process, and the amplification threshold 26 is configured based on a decibel that will not cause discomfort to the human (e.g. the voice intensity of general people (50 decibels)).

Thereafter, the processor 20 then performs a combination process for the warning sound component 24 and the non-warning sound components 25, so that the warning sound component 24 and the non-warning sound components 25 are combined to generate an output sound signal 27. In this way, the output sound signal 27 will include the warning sound component 24 that is amplified and the non-warning sound components 25 that are suppressed or muted.

After that, the speaker 30 can receive the output sound signal 27 by connecting with the processor 20, and output the output sound signal 27 to the user for listening.

Furthermore, it is effective to achieve instantly receiving the warning sound from the remote area and outputting to the user, benefiting the user in an early alert state, then reducing the probability of incident occurs thereby.

Wherein, the register 50 is connected to the processor 20 for storing the plurality of warning voiceprint data 22, the plurality of non-warning voiceprint data 23, the remote sound signal 11, the sound feature points 211, the sound feature point audios 212, the output sound signal 27, or any combinations of two or more thereof.

Moreover, since the conversion or performing between digital signals or analog signals is a prior art, in the above-mentioned signal receiving or outputting actions, the actions known in the prior art will not be repeated.

Figure 2:
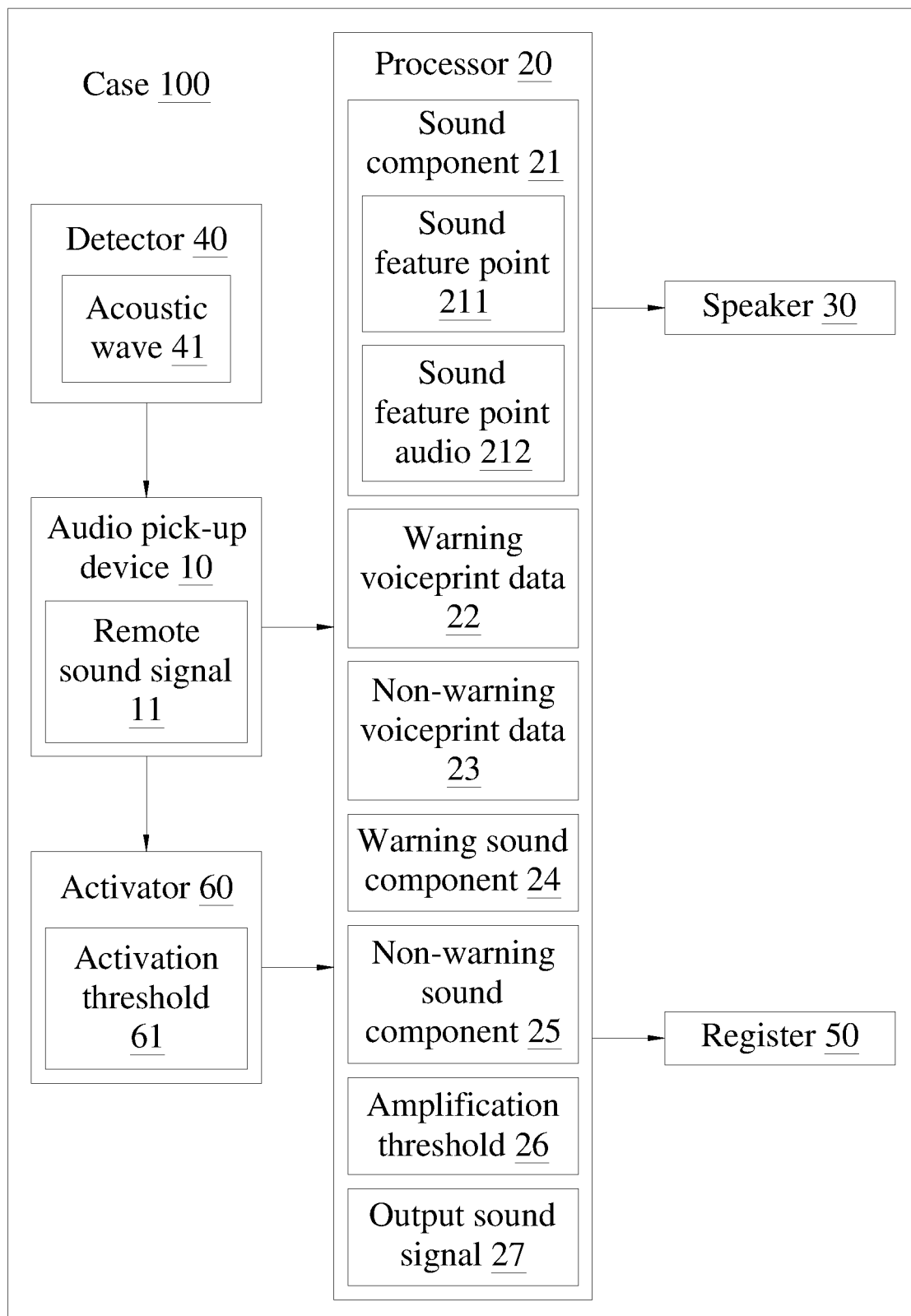
FIG. 2 illustrates a schematic diagram of an activator configuration of the present disclosure.

Please further refer to FIG. 2, which is a schematic diagram of an activator configuration of the present disclosure. As shown in the figure, in order to effectively save power, the capturing device of remote warning sound component of the present disclosure may further include an activator 60, which is disposed in the case 100 and is connected to the processor 20 and the audio pick-up device 10. The activator 60 receives the remote sound signal 11 from the audio pick-up device 10 to determine whether to activate the processor 20 according to an activating threshold 61 by comparing with a sound component data 111 (e.g. a decibel value, a frequency value, or a combination of two thereof) of the remote sound signal 11. For example, since the car engine sound and motorcycle engine sound have considerable sound intensity and a certain frequency range, therefore, when the sound component data 111 conforms the activation threshold 61 (e.g. a sound signal with a similar frequency or a sound signal with a decibel intensity is received), the activator 60 activates the processor 20 to enable the processor 20 extract the at least one sound component 21 in the remote sound signal 11, or the activator 60 continually receives another remote sound signal 11 when the sound component data 111 does not conform to the activating threshold 61, to process related determination of the activation process. The power-saving function of the capturing device of remote warning sound component of the present disclosure is effectively provided thereby.

Figure 3:
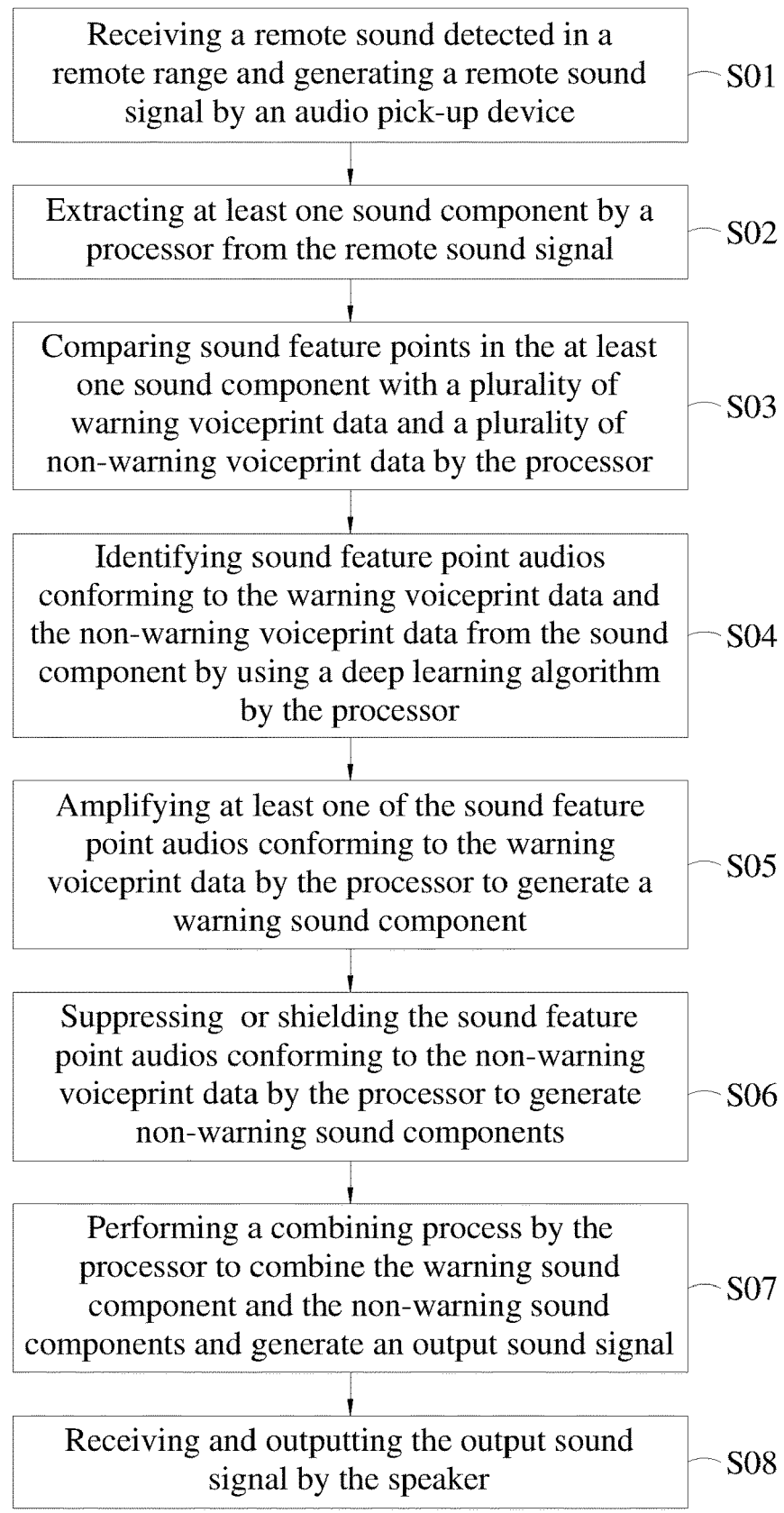
FIG. 3 illustrates a diagram of steps process of the present disclosure.

Please further refer to FIG. 3, which is a diagram of steps process of the present disclosure. As shown in the figure, the effect of remote warning sound component detection as the above-mentioned can be achieved by the following steps process, which includes:

S01: receiving a remote sound detected in a remote range and generating a remote sound signal by an audio pick-up device;

S02: extracting at least one sound component by a processor from the remote sound signal;

S03: comparing sound feature points in the at least one sound component with a plurality of warning voiceprint data and a plurality of non-warning voiceprint data by the processor;

S04: identifying sound feature point audios conforming to the warning voiceprint data and the non-warning voiceprint data from the sound component by using a deep learning algorithm by the processor;

S05: amplifying at least one of the sound feature point audios conforming to the warning voiceprint data by the processor to generate a warning sound component;

S06: suppressing or shielding the sound feature point audios conforming to the non-warning voiceprint data by the processor to generate non-warning sound components;

S07: performing a combining process by the processor to combine the warning sound component and the non-warning sound components and generate an output sound signal;

S08: receiving and outputting the output sound signal by the speaker.

Accordingly, the capturing device of remote warning sound component of the present disclosure can receive the warning sound (e.g. car engine sound) emitted from the remote end and output to the user, benefiting the user in an early alert state, then reducing the probability of incident occurs thereby.

The above description is merely illustrative rather than restrictive. Any equivalent modifications or alterations without departing from the spirit and scope of the present disclosure are intended to be included in the following claims.

In summary, regardless of the purposes, means, and effects of the present disclosure, which is showing the technical characteristics that are different from the prior art, and it is invented suitable for practical use, and also in compliance with the patent requirements of the present disclosure. Praying that the patent will be granted as soon as possible, so as to benefit society.

What is claimed is:

1. A capturing device of remote warning sound component, comprising:
   a case;
   an audio pick-up device disposed in the case, receiving a remote sound detected in a remote range and generating a remote sound signal;
   a processor disposed in the case and connected to the audio pick-up device, the processor receiving the remote sound signal and extracting at least one sound component from the remote sound signal, comparing sound feature points in the at least one sound component with a plurality of warning voiceprint data and a plurality of non-warning voiceprint data, identifying sound feature point audios conforming to the warning voiceprint data and the non-warning voiceprint data from the sound component by using a deep learning algorithm, and amplifying at least one of the sound feature point audios conforming to the warning voiceprint data to generate a warning sound component, and suppressing or shielding the sound feature point audios conforming to the non-warning voiceprint data to generate non-warning sound components, wherein the processor performs a combining process to combine the warning sound component with the non-warning sound components and generate an output sound signal;
   a speaker disposed in the case and connected to the processor to receive and output the output sound signal; and
   a register connected to the processor for storing the plurality of warning voiceprint data, the plurality of non-warning voiceprint data, the remote sound signal, the sound feature points, the sound feature point audios, the output sound signal, or any combinations of two or more thereof.

2. The capturing device according to claim 1, wherein the processor amplifies at least one of the sound feature point audios conforming to the warning voiceprint data based on an amplification threshold.

3. The capturing device according to claim 1, comprising:
   a detector connected to the audio pick-up device, wherein the detector provides a beam formed by at least two of acoustic waves in the remote range, detects a vibration waveform according to the beam to generate the remote sound signal, and transmits the remote sound signal to the audio pick-up device from the detector.

4. The capturing device according to claim 1, wherein the remote range is in a range of 1 meter to 10 meters.

5. The capturing device according to claim 1, wherein a frequency range of the remote sound signal is in a range of 1 Hz to 20000 Hz.

6. The capturing device according to claim 1, comprising:
   an activator connected to the processor and the audio pick-up device, wherein the activator receives the remote sound signal from the audio pick-up device to determine whether to activate the processor according to an activation threshold by comparing with a sound component data of the remote sound signal, the activator activates the processor to extract the at least one sound component from the remote sound signal when the sound component data conforms to the activation threshold, the activator continually receives another remote sound signal when the sound component data does not conform to the activation threshold.

7. The capturing device according to claim 6, wherein the sound component data includes a decibel value, a frequency value, or a combination of two thereof.

8. A capturing method of remote warning sound component, applicable to a capturing device of remote warning sound component, the capturing method comprising:
   receiving a remote sound detected in a remote range and generating a remote sound signal by an audio pick-up device;
   extracting at least one sound component by a processor from the remote sound signal;
   comparing sound feature points in the at least one sound component with a plurality of warning voiceprint data and a plurality of non-warning voiceprint data by the processor;
   identifying sound feature point audios conforming to the warning voiceprint data and the non-warning voiceprint data from the sound component by using a deep learning algorithm by the processor;
   amplifying at least one of the sound feature point audios conforming to the warning voiceprint data by the processor to generate a warning sound component;
   suppressing or shielding the sound feature point audios conforming to the non-warning voiceprint data by the processor to generate non-warning sound components;

performing a combining process by the processor to combine the warning sound component and the non-warning sound components and generate an output sound signal;

receiving and outputting the output sound signal by the speaker; and storing the plurality of warning voiceprint data, the plurality of non-warning voiceprint data, the remote sound signal, the sound feature points, the sound feature point audios, the output sound signal, or any combinations of two or more thereof by a register.

9. The capturing method according to claim 8, wherein the processor amplifies at least one of the sound feature point audios of the sound component conforming to the warning voiceprint data based on an amplification threshold.

10. The capturing method according to claim 8, comprising:

providing a beam formed by at least two of acoustic waves in the remote range by a detector to detect a vibration waveform according to the beam and generate the remote sound signal;

transmitting the remote sound signal to the audio pick-up device from the detector.

11. The capturing method according to claim 8, wherein the remote range is in a range of 1 meter to 10 meters.

12. The capturing method according to claim 8, wherein a frequency range of the remote sound signal is in a range of 1 HZ to 20000 HZ.

13. The capturing method according to claim 8, comprising:

receiving the remote sound signal from the audio pick-up device by an activator to determine whether to activate the processor according to an activation threshold by comparing with a sound component data of the remote sound signal;

activating the processor by the activator to extract the at least one sound component from the remote sound signal when the sound component data conforming to the activation threshold; or receiving another remote sound signal continually by the activator when the sound component data being not conforming to the activation threshold.

14. The capturing method according to claim 13, wherein the sound component data includes a decibel value, a frequency value, or a combination of two thereof.

\* \* \* \* \*